United States Patent Office 3,287,907
Patented Nov. 29, 1966

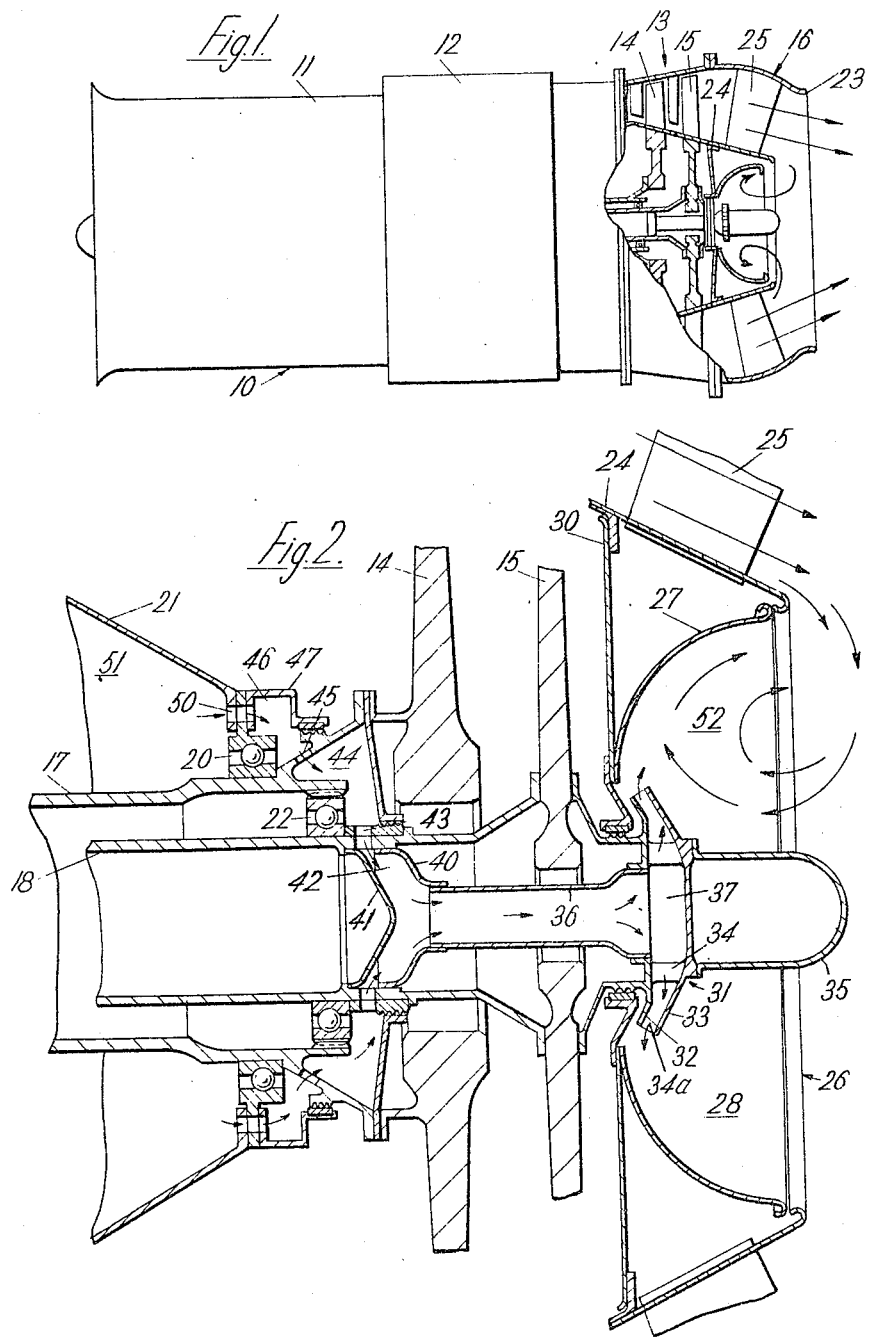

3,287,907
GAS TURBINE ENGINE EXHAUST
DUCT STRUCTURE
Arthur Bill, Derby, England, assignor to Rolls-Royce Limited, Derby, England, a company of Great Britain
Filed Apr. 1, 1965, Ser. No. 444,541
Claims priority, application Great Britain, June 12, 1964, 24,612/64
4 Claims. (Cl. 60—39.66)

This invention relates to gas turbine engines.

According to the present invention there is provided a gas turbine engine comprising compressor equipment, combustion equipment, turbine equipment and an exhaust duct all arranged in flow series, means for bleeding compressed air from a stage of said compressor equipment, means for directing it to parts of said engine to cool the parts, and booster means for boosting the pressure of the compressed air such that it may be exhausted into the gases flowing through said engine downstream of said stage.

Thus the cooling air bled or tapped from the engine may be exhausted into a relatively high pressure gas stream within the engine instead of being exhausted directly to atmosphere (e.g. by a tube extending coaxially through the exhaust duct to atmosphere).

Preferably said booster means comprises a rotary impeller through which the compressed air flows from said parts of the engine into said gases. Thus the booster means may comprise a centifugal impeller, said compressed air flowing into the eye thereof and flowing into said gases from the radially outer end thereof.

The compressed air may be exhausted into the gases flowing through said exhaust duct. Thus the exhaust duct may be annular, being defined between an outer casing member and an inner frusto-conical member, the frusto-conical member being open at its downstream end and inducing exhaust gases to form a vortex flow therewithin, and form a cone of air over which the remaining exhaust gases flow, said compressed air being exhausted into said vortex flow.

Preferably, the booster is drivingly connected to the or a main shaft of the engine on which at least part of said compressor and turbine equipment is fixed. Thus in a preferred embodiment the centrifugal impeller is mounted on a tube connected to and co-axial with a main shaft of the engine, the compressed air flowing through said tube to enter the eye of said impeller. The tube may communicate with a main bearing or bearings of the engine supporting said main shaft or shafts, the compressed air flowing past and cooling said bearing(s) prior to entering said tube.

The invention is illustrated, merely by way of example, in the accompanying drawings, in which:

FIGURE 1 is a cut away view of a gas turbine engine according to the present invention, and FIGURE 2 is a part sectional elevation of part of the engine of FIGURE 1.

Referring to the drawings, a gas turbine jet propulsion engine 10 comprises compressor equipment 11, in the form of axial flow low pressure and high pressure compressors, combustion equipment 12, turbine equipment 13 including high pressure and low pressure turbine discs 14, 15 and an exhaust duct 16, all arranged in axial flow series.

Turbine discs 14, 15 are fixed to co-axial main shafts 17, 18 respectively, the high pressure and low pressure compressors respectively also being fixed to these shafts. A main bearing 20 supports main shaft 17 from structure 21 and a main intershaft bearing 22 supports main shaft 18.

Exhaust duct 16 comprises an outer casing 23 and an inner frusto-conical member 24 rigidly connected together by a plurality of angularly spaced apart radially disposed vanes 25. Frusto-conical member 24 has an open downstream end 26 within which there is disposed an annular concave wall member 27 which defines within the member 24 a sheltered zone 28. Member 27 is supported at its radially outer end by member 24 and at its radially inner end by a radially disposed disc 30, also connected to member 24.

Disposed centrally of sheltered zone 28 is a centrifugal impeller 31 comprising axially spaced discs 32, 33 bolted together through bosses 34 integral with disc 33. Vanes 34a are defined between discs 32, 33.

A hub 35 is fixed to disc 33 and extends centrally into sheltered zone 28. A tube 36 is fixed to disc 32 and communicates with the eye 37 of impeller 31. Tube 36 is drivingly connected to an annular sheet metal member 40 fixed to the inner surface of main shaft 18. A further sheet metal cap member 41 is also fixed within main shaft 18 and defines with member 40 a radial flow passage 42 communicating with tube 36.

Radial drillings 43 in main shaft 18 communicate with passage 42 and with the space 44 between the main shafts 17, 18. Drillings 45 in main shaft 17 connect space 44 with an annular chamber 46 between the outer surface of main shaft 17 and an annular sheet metal member 47. Drillings 50 connect chamber 46 with a space 51 defined between main shaft 17 and structure 21.

In operation, exhaust gases flowing through exhaust duct 16 flow into sheltered zone 28 forming a vortex flow indicated by arrows 52. These gases form a region of high pressure downstream of frusto-conical member 24 and effectively form an extension of the member, providing a substantially conical region of air which aids in guiding the exhaust gases as they flow to atmosphere.

Cooling air, which is normally directed to atmosphere through an axially disposed hollow tube extending through a central conical exhaust duct member, cannot be removed in this matter since, of course, there is no conical member, this being replaced by the air formation described above.

In the present case, the spent cooling air is directed into the gas stream flowing through the engine downstream of the stage at which the cooling air was bled from the compressor. Since the gas stream is at a higher pressure than the cooling air, the cooling air must be boosted to a pressure higher than that of the gases at the particular part of the gas stream at which the cooling air is to be exhausted.

In the present arrangement, cooling air which has been bled from some stage of the compressor is conducted to space 51, and via drillings 50, space 46, and drillings 45 to space 44, to thereby pass bearings 20, 22 and cool them. The air then passes via drillings 43, passage 42 and tube 36 to the eye 37 of impeller 31. The air flows radially through centrifugal impeller 31, being boosted by vanes 34a as the impeller is rotated by main shaft 18 of the engine. The boosted cooling air leaving the radially outer end of impeller 31 enters the vortex flow within sheltered zone 28 mixing with the exhaust gases and thus exhausting to atmosphere.

It will be appreciated that the cooling air need not be exhausted into the gas stream flowing through the exhaust duct but could be exhausted at any convenient position. The impeller need not be driven directly by the main shafts, but could be driven by intermediate gearing—or by any other means. The cooling air may of course be used for cooling any parts of the engine and not only the rear main bearings.

The invention is equally applicable to a single shaft as well as a two shaft engine.

I claim:
1. A gas turbine engine comprising compressor equipment, combustion equipment, turbine equipment and an annular exhaust duct all arranged in flow series, said exhaust duct comprising an outer casing member and an inner frusto-conical member, the frusto conical member being open at its downstream end and inducing exhaust gases to form a vortex flow therewithin, and form a cone of gas over which the remaining exhaust gases flow, means for bleeding compressed air from a stage of said compressor equipment, means for directing it to parts of said engine to cool the parts, and booster means for boosting the pressure of the compressed air such that it may be exhausted into said vortex flow within the exhaust duct.

2. A gas turbine engine as claimed in claim 1 in which the booster means are disposed adjacent to the said vortex flow and boost the pressure of the compressed air after the latter has cooled the said parts.

3. A gas turbine engine as claimed in claim 2 in which there is a main shaft on which the compressor and turbine equipment are mounted, the booster means being drivingly connected to the main shaft.

4. A gas turbine engine as claimed in claim 3 in which the booster means comprise a centrifugal impeller, the compressed air from the compressor equipment flowing into the eye thereof and thereafter flowing into the vortex flow from the radially outer end of the impeller.

References Cited by the Examiner
UNITED STATES PATENTS
2,636,665   4/1953   Lombard _____ 230—116

MARK NEWMAN, *Primary Examiner.*
RALPH D. BLAKESLEE, *Examiner.*